R. A. FESSENDEN.
SYSTEM OF STORING POWER.
APPLICATION FILED JUNE 7, 1907.
1,247,520.
Patented Nov. 20, 1917.
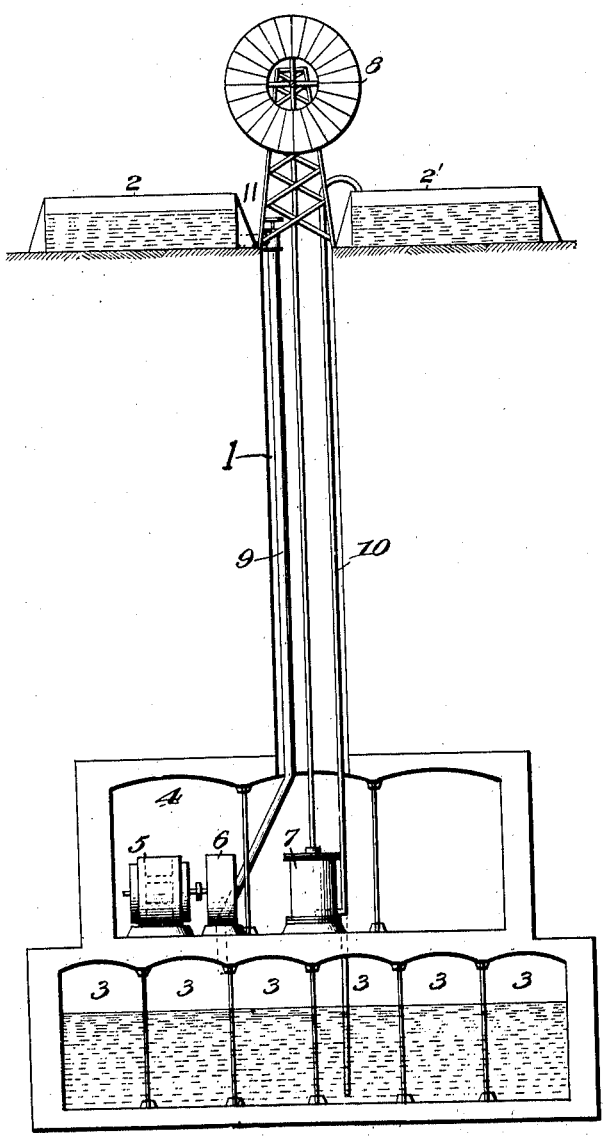

UNITED STATES PATENT OFFICE.

REGINALD A. FESSENDEN, OF BROOKLINE, MASSACHUSETTS.

SYSTEM OF STORING POWER.

1,247,520. Specification of Letters Patent. Patented Nov. 20, 1917.

Application filed June 7, 1907. Serial No. 377,834.

*To all whom it may concern:*

Be it known that I, REGINALD A. FESSENDEN, of Brookline, in the county of Norfolk and State of Massachusetts, a citizen of the United States, have invented certain new and useful Improvements in Systems of Storing Power, of which the following is the specification.

The invention herein described relates to the utilization of intermittent sources of power and more particularly to natural intermittent sources, such as solar radiation and wind power, and has for its object the efficient and practical storage of power so derived.

It has long been recognized that mankind must, in the near future, be faced by a shortage of power unless some means were devised for storing power derived from the intermittent sources of nature.

The amount of power capable of being derived from such natural and intermittent sources is substantially unlimited. It was shown by Langley that the amount of solar radiation falling in an area one mile square was approximately equal to the power of Niagara Falls, *i. e.* two million horse power. I have elsewhere (United States patent application, Serial No. 481,973, filed March 8, 1909) disclosed means whereby approximately fifteen per cent. of this can be rendered available as electric power.

It has been shown by the experiments of the Danish government and by applicant's tests at Brant Rock that an average of one horse power can be obtained throughout the year from the wind for every 150 feet of area of windmill.

These sources are, however, intermittent and the problem of storing them in a practicable way, *i. e.* at a cost which should be less than that of direct generation from coal, has for many years engaged the attention of the most eminent engineers, among whom may be mentioned Edison, Lord Kelvin, Ayrton, Perry, and Brush.

But heretofore the only method of storing such power has been by storage batteries, or water storage at an elevation. The former of these two methods is not practicable for general power storage because the initial cost of the storage battery at a discharge rate suitable for regular working is approximately seventy-five dollars ($75.00) per horse power, its efficiency is only approximately sixty per cent., and the interest and depreciation on a storage battery plant, allowing for the occurrence of a sequence of sunless or windless days, amounts to more than one hundred dollars ($100.00) per horse power per annum, while power can be generated directly from coal for less than fifty dollars ($50.00) per horse power per annum.

The second of these methods, storing water in elevated tanks, is also not practicable for general power storage purposes, as the cost of the elevated tanks is much greater even than that of storage batteries.

A modification of this method was suggested in a paper by applicant (*American Electrician*, May 1898) which consisted in placing the upper tank on the top of a high hill. At applicant's suggestion this system was installed at Johannesburg, South Africa, and proved successful. This modification, however, has but limited applicability, as few places are provided with the necessary natural elevation.

Applicant has now discovered a new instrument for storage of power which is applicable irrespective of locality and by which intermittent power may be stored at an annual cost of less than one-tenth of the cost of generation from coal. The vital problem of storage of power from natural intermittent sources is thus definitely and finally solved.

This instrument, never before suggested or published, is extremely simple in its nature and corresponds, in the simplicity of the method and importance of the result, to the historical change of the location of the eye of the needle from its end to its point. It consists in making every point on the earth's surface the top of a hill by placing the upper reservoir, not on a tower or on the top of a hill, but at or near the earth's surface and placing the lower reservoir, not on the surface of the earth, but subterraneously, so as to have a high negative gravitation potential with reference to the earth's surface. This apparatus enables, for the first time, power to be stored for general power purposes.

If the shaft connecting the lower reservoir with the upper reservoir at the surface of the earth be 1200 feet deep, one horse power hour of energy may be stored for every cubic yard of water content of the lower reservoir. Such a depth is well adapted for carrying out my invention, though a less distance is sufficient.

The cost of excavating the lower reservoir, liming and cementing it, as ascertained by tenders received from responsible contractors, and by the cost of similar work, is less than two dollars per cubic yard. This, therefore, is the first cost per horse power hour.

Interest and depreciation on the plant is therefore less than twenty cents per year per horse power hour of storage, while the cost of generation by coal is in the neighborhood of fifty dollars per horse power per year.

Other advantages of this construction are that both reservoirs may now be protected from extremes of temperature and from evaporation and that in winter the water in the upper reservoir is warmed every time it flows into and is stored in the lower reservoir. It also enables very high heads of water to be obtained, thereby enabling a very large amount of power to be stored by means of a small amount of water.

The figure, partly diagrammatic, shows an embodiment of this invention in which a wind mill is employed as the intermittent natural source of power. Here 1 is a shaft sunk into the earth for the purpose of obtaining a high head of water. Near the mouth of the shaft the upper tanks 2 2' are located. At the lower end of the shaft a number of chambers 3 are provided, which are dug after the manner of galleries in mines. Above the chambers 3, a space 4 is provided for the installation of a dynamo 5, a turbine 6, and a pump 7.

The pump 7 is coupled by suitable rods with the wind mill 8. From the tanks located on the surface a pipe 9 leads to the turbine and a pipe 10 to the pump. The suction pipe of the pump and the exhaust pipe of the turbine are connected with water tanks 3. The operation is as follows: The water is raised by the pump 7, which is driven by the wind mill, from the underground tanks to the surface tanks. When the stored-up energy is to be transformed into work, the turbine 6 is set in motion by opening the valve 11 at the upper end of the pipe 9, and current is generated by means of the dynamo 5, which current may be used for any suitable purposes.

Applicant is aware that it has been the practice in country houses to pump water to a small tank supported on the house or on a steel or wooden frame work, and applicant considers that it is possible that the water so stored may occasionally have been used to drive small turbines such as are used for polishing knives, etc. and even possibly for driving small electric dynamos, though he is not aware personally or by hearsay of such use. If, however, such use has existed, it has been merely incidental to other purposes and has not formed a practical or commercial system for storing power. In fact this would be impossible as the construction of artificial towers or supports for maintaining reservoirs of the size and at the difference of level required for a practical commercial system of power storage would be impossible on account of the mechanical difficulties and the prohibitive cost of construction. By applicant's systems it is possible commercially to obtain a great difference of level between the reservoirs and thereby to use but a small amount of water for a large amount of energy storage, and hence to reduce the cost of storage so that it is commercially feasible and also to obtain an efficient and practical system.

By high potential gravity storage system is meant a gravity storage system having its upper reservoir so high above the lower reservoir that a high potential or pressure is obtained at the lower reservoir and a large amount of energy obtained through the fall of a small body of water, and for a very small storage volume.

In addition to storing energy generated by natural forces this method may also be used for storing energy generated by steam power or other prime movers. This is in many cases advantageous for the reason that where energy can be stored there is considerable reduction in the cost of the plant and in the cost of operating. For example in a city where most of the power is used for electric lighting, it is possible to operate the plant continuously for 24 hours and store up the energy in water galleries constructed beneath sub-stations in the city, thereby enabling the power to be produced at much lower cost and also reducing the cost of the lines from the central station to the sub-stations. It can also be used at the central station itself.

What I claim as my invention is:—

Apparatus for the storage of power by pumping water from a lower level to an upper level and re-admitting it to the lower level through a water motor, comprising an upper reservoir approximately at the surface of the earth and a lower subterranean reservoir located at a great distance below the surface of the earth whereby a large amount of energy is obtained through the fall of a small body of liquid, thus making possible the employment of reservoirs of small storage capacity.

In testimony whereof I have hereunder signed my name in the presence of the two subscribed witnesses.

REGINALD A. FESSENDEN.

Witnesses:
JESSIE E. BENT,
ADELEINE A. KENT.